United States Patent [19]

Mügge et al.

[11] Patent Number: 5,258,213
[45] Date of Patent: Nov. 2, 1993

[54] MULTILAYER THERMOPLASTIC COMPOSITES

[75] Inventors: Joachim Mügge; Hubertus Ohm; Christian Gerth, all of Haltern, Fed. Rep. of Germany

[73] Assignee: Huels Aktiengesellschaft, Marl, Fed. Rep. of Germany

[21] Appl. No.: 818,591

[22] Filed: Jan. 9, 1992

[30] Foreign Application Priority Data

Apr. 18, 1991 [DE] Fed. Rep. of Germany ....... 4112668

[51] Int. Cl.$^5$ .................. B32B 1/08; B32B 27/08
[52] U.S. Cl. .................. 428/36.91; 428/474.4; 428/475.2; 428/475.5; 428/480
[58] Field of Search .................. 428/475.2, 480, 475.5, 428/36.9, 36.91, 474.4, 475.2; 523/514, 445; 525/10, 445, 183

[56] References Cited

U.S. PATENT DOCUMENTS

| | | | |
|---|---|---|---|
| 3,378,602 | 4/1968 | Robertson . | |
| 3,839,268 | 10/1974 | Kilian | 523/514 X |
| 4,101,604 | 7/1978 | Rowe | 525/10 X |
| 4,262,100 | 4/1981 | Dunleavy et al. | 525/445 |
| 4,820,771 | 4/1989 | Mussig et al. | 525/183 |
| 4,837,254 | 6/1989 | Branscome | 523/445 |
| 5,077,111 | 12/1991 | Collette | 428/475.2 X |
| 5,084,352 | 1/1992 | Percec et al. | 428/475.2 |

FOREIGN PATENT DOCUMENTS

| | | |
|---|---|---|
| 0117622 | 9/1984 | European Pat. Off. . |
| 0118409 | 9/1984 | European Pat. Off. . |
| 0204315 | 12/1986 | European Pat. Off. . |
| 0271097 | 6/1988 | European Pat. Off. . |
| 0435787 | 7/1991 | European Pat. Off. . |

*Primary Examiner*—Thomas J. Herbert, Jr.
*Attorney, Agent, or Firm*—Oblon, Spivak, McClelland, Maier & Neustadt

[57] ABSTRACT

Multilayer thermoplastic composites comprising (a) a layer comprising a polyamide molding composition, (b) a layer comprising a polyester molding composition, and (c) an adhesion promoter intermediate layer (a) and layer (c) find use as structural components in the electrical engineering, machine production and automotive industries, and for foodstuff packaging films or multilayer pipes.

16 Claims, No Drawings

MULTILAYER THERMOPLASTIC COMPOSITES

BACKGROUND OF THE INVENTION

1. Field of the Invention

The invention relates to multilayer thermoplastic composites made from a polyamide-based molding composition, a polyester-based molding composition and an adhesion promoter; and to a process for the production of these composites; and to their use.

2. Description of the Prior Art

Polyamides and polyesters on their own are unsuitable for many applications. Thus, polyamides are, for example, not resistant to weathering since they age on exposure to light and absorb moisture from the atmosphere. This results in discoloration, impairment of mechanical properties and warping.

Although polyamides on their own have good mechanical properties, in particular good toughness, they have a poor barrier action. Polar substances, in particular, can easily migrate through polyamides. This is extremely disadvantageous, for example in fuel lines transporting alcohol-containing fuel.

Polyesters generally have good weather resistance and have an excellent barrier action both to polar and to nonpolar media. However, they are generally impact-sensitive. The notched impact strength, in particular, in polyesters is frequently inadequate. The resistance to some chemical influences is also inadequate. Polyesters therefore cannot be used in many cases where other properties, such as their excellent barrier action, high temperature resistance and good rigidity, would actually be desired.

It would therefore be desirable if it were possible to produce a strong bond between polyamide and polyester. It would thus be possible, for example, to protect polyamide moldings against light and moisture by coating with polyester. Likewise, it would be possible to protect polyester moldings against chemical and mechanical influences by coating with polyamide. A further advantage here would be better printability.

Composites made from polyamide and polyester have, in principle, already been disclosed. EP-A 0 336 806 described the coextrusion of polyamide 12 (PA 12) and polybutylene terephthalate (PBT) to give a two-layer tube. German Patent 38 27 092 describes a multilayer tube which comprises, from the inside outward, layers of polyamide, polyvinyl alcohol, polyamide and polyester. However, it is known to a person skilled in the art that, by far, the majority of polymers, including polyamides and polyesters, are incompatible with one another, which is why no adhesion is achieved between the laminate layers in the production of polymer laminates. However, an adhesion-based bond between the individual polymer layers is absolutely necessary in conventional industrial applications.

EP-A 0 287 839 discloses composites made from specific polyamide mixtures and various other thermoplastics, such as, for example, polyethylene terephthalate. In order to achieve the requisite adhesion between the two layers, an adhesion promoter is introduced between the laminate layers. Suitable adhesion promoters indicated in this publication are functionalized polyolefins, functionalized ethylene-vinyl acetate copolymers, ethylene-acrylate copolymers, ionomers, polyalkylene oxide polyester block copolymers, derivatives of carboxymethylcellulose and blends of these polymers with polyolefins.

However, it has now been shown that these adhesion promoters generally do not produce an adhesion-based bond, especially in the polyamide/polyester system. Even if a certain adhesion is achieved in some cases, it is lost on warming or on contact with solvents, since the adhesion promoters are not sufficiently heat- and solvent-resistant. In addition, bonds of this type easily fail when subjected to shear stress due to cold flow of the adhesion promoter.

SUMMARY OF THE INVENTION

It is an object of the present invention to provide a solvent- and heat-resistant bond between polyester and polyamide which is insensitive to shear stress and has good mechanical properties. In particular, it is desired to achieve strong cohesion at the phase interfaces.

This object has been achieved by the provision of a multilayer thermoplastic composite comprising (a) a layer comprising a polyamide molding composition;

(b) a layer comprising a polyester molding composition; and (c) an adhesion promoter, intermediate layer (a) and layer (b), comprising a polymer which is compatible with layer (a), a polymer blend which is compatible with layer (a), a polymer which is compatible with layer (b), a polymer blend which is compatible with layer (b) or a mixture thereof.

DETAILED DESCRIPTION OF THE INVENTION

Polyamide Molding Composition

Polyamides are taken to mean polymers in which the monomer units are predominantly, i.e., to the extent of at least 60% linked to one another by amide bonds of the formula

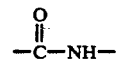

Such polymers include:

1) Homopolymers and copolymers derived from dicarboxylic acids, diamines, aninocarboxylic acids and/or lactams. They preferably have an exclusively aliphatic structure. Particular mention should be made here of PA 6, PA 46, PA 66, PA 612, PA 1010, PA 1012, PA 11, PA 12, PA 1212 and mixtures thereof. The polyamides (PA) are characterized in accordance with international standards, the first number(s) indicating the number of carbon atoms in the starting amine and the last number(s) indicating the number of carbon atoms in the dicarboxylic acid. Indication of only one number means that the starting material is an aminocarboxylic acid or a lactam thereof (H. Domininghaus, "Die Kunststoffe und ihre Eigenschaften" [Plastics and their Properties], VDI Verlag, 1976, page 272). However, mixed aliphatic aromatic copolyamides are also suitable (cf. U.S. Pat. Nos. 2,071,250, 2,071,251, 2,130,523, 2,130,948, 2,241,322, 2,312,966, 2,512,606 and 3,393,210; Kirk-Othmer, Encyclopedia of Chemical Technology, Col. 18, John Wiley & Sons (1982), pages 328 to 435).

The number average molecular weight of the polyamides should be greater than 5000, preferably greater than 10,000.

2) Polyether-amides and polyether-ester-amides. Products of this type are described, for example, in DE-A 27 12 987, 25 23 991 and 30 06 961.

The polyamide molding composition may additionally contain further thermoplastics, such as, for example, polyphenylene ethers, if desired, modified in accordance with techniques well-known in the art; polystyrene, if desired, modified in accordance with techniques well-known in the art; styrene-maleic anhydride copolymers; acrylonitrile-butadiene-styrene copolymers; styrene-acrylonitrile copolymers; acrylonitrile-styrene-acrylate copolymers; other styrene copolymers; and polyolefins, if desired, modified in accordance with techniques well known in the art.

Suitable polyphenylene ethers (PPE) are polymers built up from units of the formula:

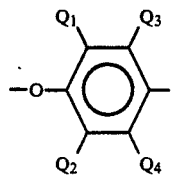

where $Q_1$ and $Q_2$ are alkyl radicals, preferably primary, having 1 to 10 carbon atoms, cycloalkyl radicals having 5 to 10 carbon atoms, benzyl radicals having 7 to 10 carbon atoms or aryl radicals having 6 to 10 carbon atoms; and $Q_3$ and $Q_4$ can have the same meaning as $Q_1$ and $Q_2$, but are preferably hydrogen.

These polyphenylene ethers can be prepared by any process conventional in the art. The corresponding phenols are usually oxidatively coupled using an oxygen-containing gas, such as, for example, air, in the presence of a catalyst complex. If a p-halogenated phenol is used, a sufficient amount of acid acceptor must be present. The catalysts used are preferably copper-amine complexes or manganese-containing systems (DE-A 32 24 691 and 32 24 692, and U.S. Pat. Nos. 3,306,874, 3,306,875 and 4,028,341). The viscosity numbers, J, determined in accordance with DIN 53 728 in chloroform at 25° C., are in the range from 20 to 80 cm$^3$/g (concentration 5 g/l), preferably in the range from 40 to 70 cm$^3$/g. These polyphenylene ethers can be prepared using, for example, the following monomers: 4-bromo-2,6-dimethylphenol, 2-methyl-6-ethylphenol, 2,6-diethylphenol, 2-methyl-6-tert-butylphenol, 4-bromo-2,6-diphenylphenol, 2-benzyl-6-methylphenol, 2,6-dibenzylphenol, 2,3,6-trimethylphenol or preferably 2,6-dimethylphenol. It is of course also possible to use mixtures of such phenols.

Also included are, of course, natural or modified polyphenylene ethers, for example, graft copolymers with vinyl monomers, styrene or other modifying reagents.

Preferably, the polyamide molding composition has a continuous polyamide phase.

Polyester Molding Composition

Polyesters are taken to mean polymers in which the monomer units are predominantly, i.e., to the extent of at least 60% linked to one another by ester bonds. Such polymers include homopolymers and copolymers derived from dicarboxylic acids, diols, bisphenols, hydroxycarboxylic acids and/or lactones. Examples of suitable diol components include ethylene glycol, trimethylene glycol, tetramethylene glycol, hexamethylene glycol, 1,4-cyclohexanedimethanol and neopentyl glycol; and examples of suitable dicarboxylic acid components include isophthalic acid, terephthalic acid, 2,6-, 2,7-, 1,5-and 1,4-naphthalenedicarboxylic acid, diphenic acid and diphenyl ether 4,4'-dicarboxylic acid. It is possible, in the known manner, to replace some of the diol component by a compound HO—(—R—O—)$_x$—H where x is at least 10 and R is a divalent saturated group having 2 to 4 carbon atoms. Likewise, a maximum of 20 mol% of the dicarboxylic acid component can be replaced by an aliphatic dicarboxylic acid having 2 to 12 carbon atoms, such as, for example, succinic acid, maleic acid, fumaric acid, adipic acid, sebacic acid or dodecanedioic acid. Examples of suitable bisphenols include bisphenol A, bisphenol T, hydroquinone, tetramethylbisphenol A and tetramethylbisphenol S. An example of a suitable hydroxycarboxylic acid is p-hydroxybenzoic acid, and a particularly suitable lactone is caprolactone.

These polyesters are usually prepared ny condensing a diol, for example ethylene glycol, 1,4-butanediol or 1,4-cyclohexanedimethanol, with an aromatic dicarboxylic acid, such as, for example, isophthalic or terephthalic acid, or an ester thereof. The preferred polyester is polyethylene terephthalate (PET) or polybutylene terephthalate (PBT) or a copolyester of 1,4-butanediol, dodecanedioic acid or terephthalic acid.

Processes for the preparation of these polyesters are described in detail in the literature (for example, Ullmanns Enzyklopädie der technischen Chemie (Ullman's Encyclopaedia of Industrial Chemistry), Volume 19, pages 61 ff., and DE-A 24 07 155 and DE-A 24 07 156).

The polyester molding composition may additionally contain further thermoplastics, such as, for example, polycarbonates (PC), styrene-maleic anhydride copolymers, acrylonitrile-butadiene-styrene copolymers (ABS), styrene-acrylonitrile copolymers, acrylonitrile-styrene-acrylate copolymers or mixtures thereof.

Particularly suitable polycarbonates are the aromatic types, which are generally known to a person skilled in the art; cf., for example, Kirk-Othmer, Encyclopedia of Chemical Technology, Vol. 18, John Wiley & Sons (1982), pages 479 to 494. They are obtained by reacting a bisphenol with a carbonate precursor, such as phosgene, a chloroformate or a formate. Typical bisphenols are bisphenol A, bisphenol T, tetramethylbisphenol A and tetramethylbisphenol S. The preferred polycarbonate is the homopolymer derived from bisphenol A.

Preferably, the polymer molding composition has a continuous polyester phase.

Impact Modifiers

The polyamide molding composition and/or the polyester molding composition may contain one or more impact-modifying rubbers. Examples of suitable compounds are ethylene-propylene or ethylene-propylene-diene copolymers, polypentenylene, polyoctenylene or random or block copolymers made from alkenylaromatic compounds with olefins or dienes.

The impact-modifying rubbers may be functionalized in accordance with techniques well-known in the art, for example, using maleic anhydride (MA), if desired in the presence of styrene.

Other toughening rubbers which may be mentioned are: core-shell rubbers having a tough, elastic core made from acrylate rubber, butadiene rubber or styrene-butadiene rubber, in each case having a glass transition temperature $T_g$ of $< -10°$ C., it being possible for the core to be crosslinked in each case. The shell may be built up from styrene and/or methyl methacrylate and/or further unsaturated monomers, if desired, carrying acid or acid anhydride groups.

Other Additives

The polyamide molding composition and/or the polyester molding composition may contain a flameproofing agent and further additives, such as pigments, oligomers, polymers, antistatics, stabilizers, processing aids and reinforcing agents. The proportion of reinforcing agents may be up to 50%, the proportion of flameproofing agents up to 154 and the proportion of all other additives, in total, up to 5%, in each case based on the total molding composition. Particularly suitable flameproofing agents are aromatic phosphorus compounds, such as triphenylphosphine oxide, triphenyl phosphite and triphenyl phosphate. It is also possible to use a conventional halogen-containing flameproofing agent. Suitable compounds are halogen-containing organic compounds, as described, for example, in the monograph by H. Vogel, "Flammfestmachen von Kunststoffen" [Flameproofing of Plastics], Hüthig-Verlag, 1966, pages 94 to 102. However, these may also be halogenated polymers, such as, for example, halogenated polyphenylene ethers (see DE-A 33 34 068) or brominated oligo- or polystyrenes. The compounds should contain more than 30% by weight of halogen.

If halogen-containing flameproofing agents are used, it is advisable to use a synergist. Suitable compounds are those of antimony, boron and tin. These are generally employed in amounts of from 0.5 to 10% by weight, based on the thermoplastic compositions. Particularly suitable reinforcing agents are glass fibers and carbon fibers.

Suitable stabilizers include organic phosphites, such as, for example, didecyl phenyl phosphite and trilauryl phosphite, sterically hindered phenols, and tetramethylpiperidine, benzophenone and triazole derivatives.

Suitable processing aids are waxes, such as, for example, oxidized hydrocarbons and their alkali metal and alkaline earth metal salts.

Adhesion Promoter

The adhesion promoter is a molding composition which is compatible both with layer (a) and with layer (b), i.e., it gives strong cohesion and is therefore suitable as an adhesion promoter. In principle, it is sufficient in many cases for the adhesion promoter to be based either on a suitable polyamide or on a suitable polyester. Since a person skilled in the art knows from the literature which polymers are compatible with a certain polyamide or polyester, he can therefore make his choice without difficulty.

In a preferred embodiment, the adhesion promoter comprises a polymer mixture which contains a polymer which is compatible with layer (a), generally a polyamide, and a polymer which is compatible with layer (b), generally a polyester or a polycarbonate. A particularly suitable polycarbonate is that based on bisphenol A. The polymers which are compatible with layers (a) or (b) may also themselves be blends, for example, comprising PA 6 and PA 66 or comprising PA 12 and PA 1012, on the one hand, and comprising polybutylene terephthalate (PBT) and polycarbonates, on the other hand.

In order to achieve a good adhesive action on both sides, the polymers or polymer blends which are compatible with layer (a) and with layer (b) are preferably employed in a weight ratio of from 30:70 to 70:30, particularly preferably in a weight ratio of from 40:60 to 60:40.

In order to provide the adhesion promoter with good heat- and solvent-resistance, it should contain at least 50% by weight, preferably at least 70% by weight and particularly preferably at least 85% by weight, of polyamide, polyester or mixtures thereof. Partially crystalline polyamides and polyesters having a crystallite melting point $T_m$ of at least about 140° C. are preferred.

The adhesion-promoting action of the adhesion promoter can be further increased if at least some of the polyamide and some of the polyester is in the form of polyamide-polyester block copolymers. These can be prepared in various ways in accordance with techniques well-known in the art.

For example, U.S. Pat. No. 3,378,602 describes a process for the preparation of polyamide-polyester block copolymers by a reaction in the melt without a catalyst. EP-A 0 084 643 describes a process for the preparation of block copolymers in which an effective amount of a phosphite is added. Furthermore, the preparation of polyamide-polyester block polymers in the melt can be carried out using the following catalysts: compounds of tin, titanium, zirconium, manganese, zinc or antimony, for example, tin(II) oxalate, dibutyltin oxide, dibutyltin dilaurate, titanium tetraisopropoxide, zirconium tetraisoproxide, manganese acetate, zinc oxide, zinc acetate, antimony trioxide or antimony acetate. The catalysts are preferably employed in amounts of from 0.05 to 1.0% by weight.

Block copolymers of this type are most easily prepared in accordance with the above-mentioned EP-A 0 084 643 by mixing the melts of a polyamide containing amino end groups, a polyester containing carboxyl end groups, and a compound of trivalent phosphorus, in particular triphenyl phosphite.

Multilayer Composite Production

The multilayer composites can be produced in one or more steps.

In a one-step injection-molding process, the various melts are combined in a mold, and the molding is allowed to cool (multicomponent injection molding).

In a one-step extrusion process, the various melts are coextruded in a conventional manner.

In a multistep process, a molding is first produced wither from component a) or component b), and then coated with the other components, which can be effected by pressing, injection molding or extrusion.

These multilayer composites are used in structural components, in particular, in the electrical engineering, machine construction and automotive industries, in applications where the rigidity of the polyester is to be combined with the toughness of the polyamide or where the disadvantageous properties of the polyamide, such as poor UV resistance, inadequate scratch resistance or poor barrier effect, are to be compensated by a polyester coating. In particular, they are used as films, more particularly, as foodstuff packaging films; or as multilayer tubes, for example, in the automotive industry.

EXAMPLES 1 TO 18

Production of the Multilayer Composites

The dried starting components are first converted individually into pressed sheets about 1 mm thick (pressing time: 10 minutes, pressing temperature: at least 10° C. above the melting or softening point). No mold release agents may be used. The individual sheets are then pressed in the desired sequence to form a multilayer composite. The pressing temperature depends on the material having the highest melting or softening point. The pressing time is again 10 minutes.

Testing of the Multilayer Composites

The material interface to be tested is separated using a metal wedge (edge angle 5 degrees). If the separation takes place everywhere precisely at the transition from one component to the other, the adhesion is poor. By contrast, if the separation takes place entirely or partially within one of the two components, the adhesion is good. The results are shown in Tables 1 and 2.

Materials Used

A1: Polyamide 12, VESTAMID ® X4887 (HÜLS)
A2: Polyamide 6, ULTRAMID ® B4 (BASF)
A3: Polyamide 66, ULTRAMID ® A4 (BASF)
A4: Polyamide 12, VESTAMID ® X1852 (HÜLS)
A5: Polyamide 12/PPE blend, VESTOBLEND ® 1500 (HÜLS)

B1: Polybutylene terephthalate, VESTODUR ® 3000 (HÜLS)
B2: Polyethylene terephthalate, POLYCLEAR ® TR86 (HOECHST)
B3: PBT/PC blend, prepared from 70 parts by weight of VESTODUR ® 3000 (HÜLS), 30 parts by weight of MAKROLON ® 2800 (BAYER) and 0.1 part by weight of a phosphite stabilizer
B4: PBT/ABS blend, prepared from 70 parts by weight of VESTODUR ® 3000 (HÜLS) and 30 parts by weight of BAYMOD ® (BAYER)

C1: MA-modified SEBS, KRATON ® FG 1901X (SHELL)
C2: MA-modified EPM, EXXELOR ® VA1803 (EXXON)
C3: MA-modified PP, ADMER ® QR500 (Mitsui)
C4: 50 parts by weight of polyamide 12 ($\eta_{rel}$ in accordance with ISO 307/DIN 53 727 in 0.5% strength cresol solution: 1.91, content of amino end groups: 80 mmol/kg, content of carboxyl end groups: 20 mmol/kg) were mixed in the melt with 50 parts by weight of PBT (viscosity number J, measured in accordance with DIN 53 728 at 25° C. in o-dichlorobenzene/phenol (50 parts by weight each, concentration: 5 g/l): 165 m$^3$/g, content of carboxyl groups: 40 mmol/kg) and 0.1 part by weight of triphenyl phosphite in a Leistritz 30.34 continuous corotating twin screw kneader at a jacket temperature of 260° C., a material throughput of 3 kg/h and a screw speed of 50 rpm, and the mixture was extruded and granulated.
C5: 50 parts by weight of polyamide 12 ($\eta_{rel}$ in accordance with ISO 307/DIN 53 727 in 0.5% strength cresol solution: 1.91, content of amino end groups: 80 mmol/kg, content of carboxyl end groups: 20 mmol/kg) were mixed in the melt with 50 parts by weight of PBT (viscosity number J, measured in accordance with DIN 53 728 at 25° C. in o-dichlorobenzene/phenol (50 parts by weight each, concentration: 5 g/l): 155 m$^3$/g, content of carboxyl groups: 40 mmol/kg) and 0.1 part by weight of dibutyltin oxide in a Leistritz 30.34 continuous corotating twin screw kneader at a jacket temperature of 260° C., a material throughput of 3 kg/h and a screw speed of 50 rpm, and the mixture was extruded and granulated.
C6: 100 parts by weight of a polybutylene terephthalate containing predominantly hydroxyl end groups are reacted with 11 parts by weight of a polyfunctional isocyanate IPDI T 1890 (HÜLS) in the melt at 250° C. and subsequently remelted with 100 parts by weight of the polyamide 12 used in C4, and the product was extruded and granulated.
C7: 50 parts by weight of polyamide 6 (medium viscosity, containing predominantly amino end groups) were mixed in the melt with 50 parts by weight of PET (viscosity number J, measured in accordance with DIN 53 728 at 25° C. in o-dichlorobenzene/phenol (50 parts by weight each, concentration: 5 g/l): 110 cm$^3$/g) containing predominantly carboxyl end groups and 0.1 part by weight of triphenyl phosphite in a Leistritz 30.34 continuous corotating twin-screw kneader at a jacket temperature of 280° C., a material throughput of 3 kg/h and a screw speed of 50 min$^{-1}$, and the product was extruded and granulated.

TABLE 1

COMPARATIVE EXAMPLES NOT ACCORDING TO THE INVENTION

| Example | Layer A | Layer B | Intermediate layer | Mechanically separable at the interface at RT | at 160° C. | after storage in solvent$^a$ |
|---|---|---|---|---|---|---|
| 1 | A1 | B1 | — | yes | yes | yes |
| 2 | A1 | B1 | C1 | no | yes | yes |
| 3 | A1 | B1 | C2 | no | yes | yes |
| 4 | A2 | B1 | — | yes | yes | yes |
| 5 | A1 | B1 | C3 | yes | yes | yes |
| 6 | A4 | B1 | C3 | yes | yes | yes |
| 7 | A4 | B2 | C3 | yes | yes | yes |
| 8 | A3 | B2 | — | yes | yes | yes |
| 9 | A4 | B3 | — | yes | yes | yes |
| 10 | A4 | B4 | — | yes | yes | yes |
| 11 | A4 | B3 | C1 | no | yes | yes |

$^a$Solvent mixture toluene/hexane (1:1 w/w)

TABLE 2

EXAMPLES ACCORDING TO THE INVENTION

| Example | Layer A | Layer B | Intermediate layer | Mechanically separable at the interface at RT | at 160° C. | after storage in solvent$^a$ |
|---|---|---|---|---|---|---|
| 12 | A4 | B1 | C4 | no | no | no |
| 13 | A4 | B1 | C5 | no | no | no |
| 14 | A4 | B1 | C6 | no | no | no |
| 15 | A2 | B2 | C7 | no | no | no |
| 16 | A1 | B4 | C4 | no | no | no |
| 17 | A5 | B1 | C6 | no | no | no |
| 18 | A4 | B3 | C4 | no | no | no |

$^a$Solvent mixture toluene/hexane (1:1 w/w)

What is claimed as new and desired to be secured by Letters Patent of the United States is:

1. A multilayer thermoplastic composite comprising:
   (a) a layer comprising a polyamide molding composition;

(b) a layer comprising a polyester molding composition; and (c) an adhesion promoter, intermediate to said layer (a) and said layer (b), comprising at least one element selected from the group consisting of a polymer which is compatible with layer (a), a polymer blend which is compatible with layer (a), a polymer which is compatible with layer (b), a polymer blend which is compatible with layer (b) or a mixture thereof.

2. The multilayer thermoplastic composite according to claim 1, wherein said polyamide molding composition comprises PA 6, PA 46, PA 66, PA 612, PA 1010, PA 11, PA 12, PA 1212 or mixtures thereof; and said polyester molding composition comprises polyethylene terephthalate or polybutylene terephthalate.

3. The multilayer thermoplastic composite according to claim 1, wherein said polyamide molding composition has a continuous polyamide phase; and said polyester molding composition has a continuous polyester phase.

4. The multilayer thermoplastic composite according to claim 1, wherein said polymer which is compatible with layer (a) is a polyamide; and said polymer which is compatible with layer (b) is a polyester.

5. The multilayer thermoplastic composite according to claim 1, in the form of a film.

6. The multilayer thermoplastic composite according to claim 1, in the form of a tube.

7. The multilayer thermoplastic composite according to claim 1, wherein said polymer which is compatible with layer (a) or said polymer blend which is compatible with layer (a) and said polymer which is compatible with layer (b) or said polymer blend which is compatible with layer (b) are employed in a weight ratio of from 30:70 to 70:30.

8. The multilayer thermoplastic composite according to claim 7, wherein said polymer which is compatible with layer (a) or said polymer blend which is compatible with layer (a) and said polymer which is compatible with layer (b) or said polymer blend which is compatible with layer (b) are employed in a weight ratio of from 40:60 to 60:40.

9. The multilayer thermoplastic composite according to claim 1, wherein said adhesion promoter comprises a polyamide, a polyester or a mixture of a polyamide and a polyester.

10. The multilayer thermoplastic composite according to claim 9, wherein said adhesion promoter comprises at least 50% by weight of said polyamide, said polyester or said mixture of a polyamide and a polyester.

11. The multilayer thermoplastic composite according to claim 9 wherein said adhesion promoter comprises at least 70% by weight of said polyamide, said polyester or said mixture of a polyamide and a polyester.

12. The multilayer thermoplastic composite according to claim 9 wherein said adhesion promoter comprises at least 85% by weight of said polyamide, said polyester or said mixture of a polyamide and a polyester. (a) is a polyamide; and said polymer which is compatible with layer (b) is a polyester.

13. The multilayer thermoplastic composite according to claim 9, wherein said adhesion promoter is a mixture of a polyamide and a polyester; and at least a portion of said polyamide and at least a portion of said polyester are in the form of a polyamide-polyester block copolymer.

14. A process for the production of a multilayer thermoplastic composite according to claim 1, said process comprising:

molding melts of said polyamide molding composition, said polyester molding composition and said adhesion promoter; and cooling said molded melts.

15. The process according to claim 14, wherein said molding is effected by multicomponent injection molding.

16. The process according to claim 14, wherein said molding is effected by coextrusion.

* * * * *